United States Patent
Garrison et al.

(10) Patent No.: US 9,609,300 B2
(45) Date of Patent: *Mar. 28, 2017

(54) METHOD AND APPARATUS FOR REPRESENTING STORAGE CAPACITY ALLOCATION OF AN AUDIO/VIDEO RECORDING DEVICE

(71) Applicant: Google Technology Holdings LLC, Mountain View, CA (US)

(72) Inventors: William J. Garrison, Warminster, PA (US); Albert F. Elcock, Havertown, PA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/216,315

(22) Filed: Jul. 21, 2016

(65) Prior Publication Data

US 2016/0330424 A1  Nov. 10, 2016

Related U.S. Application Data

(63) Continuation of application No. 10/743,246, filed on Dec. 22, 2003, now Pat. No. 9,426,407.

(51) Int. Cl.
| | |
|---|---|
| *H04N 5/78* | (2006.01) |
| *H04N 9/804* | (2006.01) |
| *H04N 5/76* | (2006.01) |
| *H04N 5/765* | (2006.01) |
| *H04N 5/781* | (2006.01) |
| *H04N 5/85* | (2006.01) |
| *H04N 5/907* | (2006.01) |

(52) U.S. Cl.
CPC ............. *H04N 9/8042* (2013.01); *H04N 5/76* (2013.01); *H04N 5/765* (2013.01); *H04N 5/7605* (2013.01); *H04N 5/781* (2013.01); *H04N 5/85* (2013.01); *H04N 5/907* (2013.01)

(58) Field of Classification Search
CPC ...... H04N 9/8042; H04N 5/85; G11B 27/034; G11B 27/105; G11B 2220/2562
USPC .......................................................... 386/83
See application file for complete search history.

(56) References Cited

U.S. PATENT DOCUMENTS

| | | |
|---|---|---|
| 6,108,728 A | 8/2000 | Kobayashi |
| 6,671,454 B1 | 12/2003 | Kaneko et al. |

(Continued)

*Primary Examiner* — William C Vaughn, Jr.
*Assistant Examiner* — Daniel Tekle
(74) *Attorney, Agent, or Firm* — Fish & Richardson P.C.

(57) ABSTRACT

A method and apparatus for representing allocation of capacity of a storage unit within an audio/video (AV) recording device is described. In one example, a quantity of AV program data stored on the storage unit is determined. A storage schedule for new AV program data that is defined over a predetermined time period is obtained. A deletion schedule for old AV program data that is defined over the predetermined time period is obtained. Temporally dynamic indicia is produced that is representative of allocation of the capacity of the storage unit over the predetermined time period in response to the quantity of stored AV program data, the storage schedule, and the deletion schedule. A pictorial representation of the temporally dynamic indicia may then be displayed on a display coupled to the AV recording device.

20 Claims, 2 Drawing Sheets

(56) References Cited

U.S. PATENT DOCUMENTS

2002/0054750 A1* 5/2002 Ficco ................... G11B 27/034
                                                                        386/214

2002/0172496 A1 11/2002 Gunji et al.

\* cited by examiner

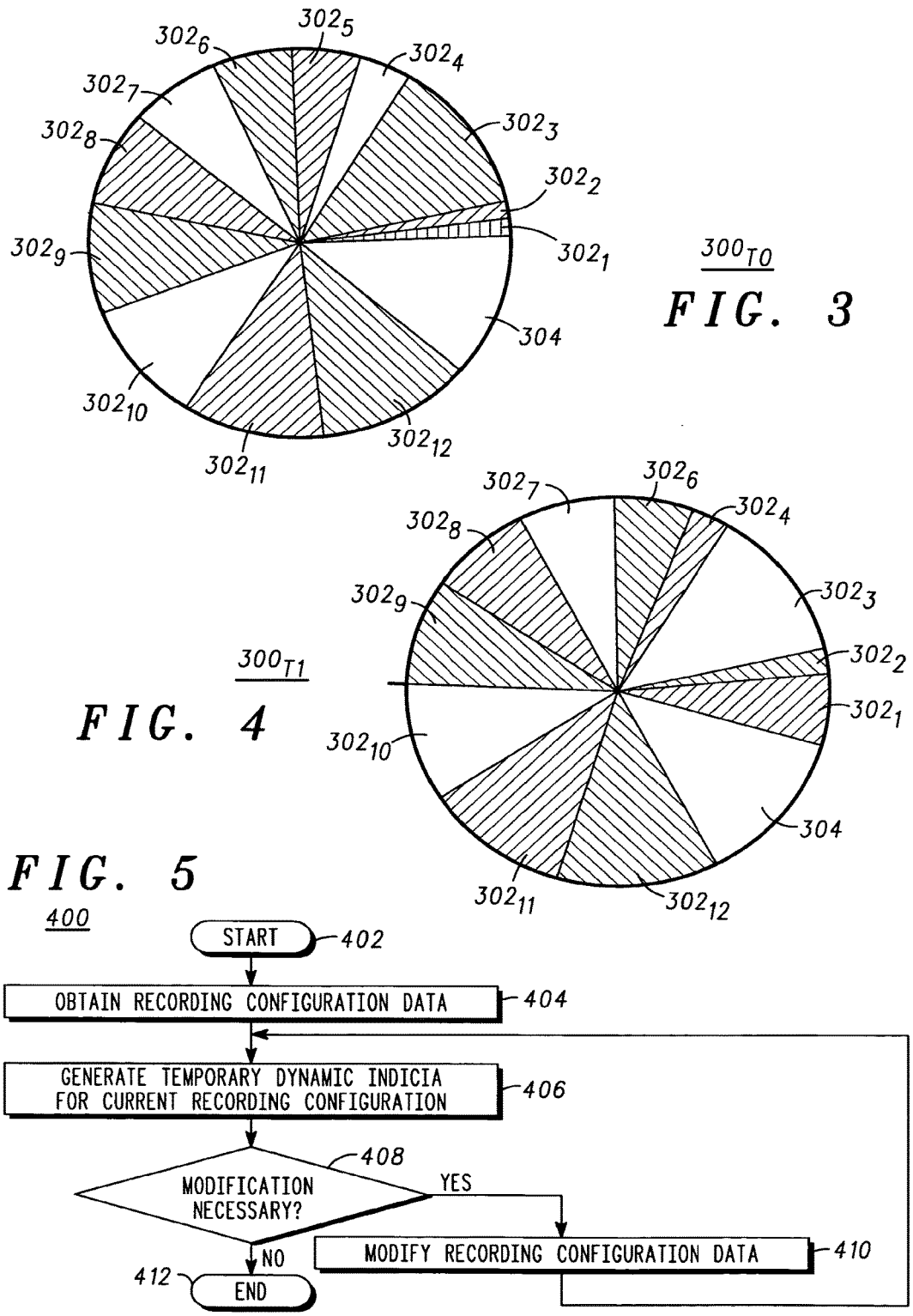

METHOD AND APPARATUS FOR REPRESENTING STORAGE CAPACITY ALLOCATION OF AN AUDIO/VIDEO RECORDING DEVICE

BACKGROUND OF THE INVENTION

Field of the Invention

The present invention generally relates to audio/video recording systems and, more particularly, to representing storage capacity allocation of an audio/video recording device.

Description of the Related Art

Digital video recording systems (DVRs), also referred to as personal video recording systems (PVRs), allow a user to record audio/video (AV) programs to memory such as, for example, a hard disk drive. A typical DVR device is capable of recording AV programs during time intervals specified by the user. For example, a DVR may be configured to record several AV programs on a weekly, daily, or other type of user-specified basis.

The storage capacity of a DVR device is primarily dictated by the capacity of the storage device and the quality of the stored AV program recordings. One problem with conventional DVR devices is that, while there may be sufficient storage capacity to record the desired AV programs at the time of configuration, there may not be enough storage capacity at the actual time of recording.

Accordingly, there exists a need in the art for a method and apparatus that accurately represents the storage capacity of an AV recording device as it varies with time.

SUMMARY OF THE INVENTION

A method and apparatus for representing allocation of capacity of a storage unit within an audio/video (AV) recording device is described. In one embodiment, a quantity of AV program data stored on the storage unit is determined. A storage schedule for new AV program data that is defined over a predetermined time period is obtained. A deletion schedule for old AV program data that is defined over the predetermined time period is obtained. Temporally dynamic indicia is produced that is representative of allocation of the capacity of the storage unit over the predetermined time period in response to the quantity of stored AV program data, the storage schedule, and the deletion schedule. A pictorial representation of the temporally dynamic indicia may then be displayed on a display coupled to the AV recording device. For example, the pictorial representation may be an animated pie chart representative of the allocation and changing available storage capacity of the storage unit over the predetermined time.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3 and 4 illustrate an exemplary embodiment of a pictorial display for temporally dynamic indicia representative of storage capacity allocation in accordance with the invention; and FIG. 5 is a flow diagram depicting an exemplary embodiment of a process for modifying a recording configuration of an AV recording device.

To facilitate understanding, identical reference numerals have been used, wherever possible, to designate identical elements that are common to the figures.

DETAILED DESCRIPTION OF THE INVENTION

Figure 1:
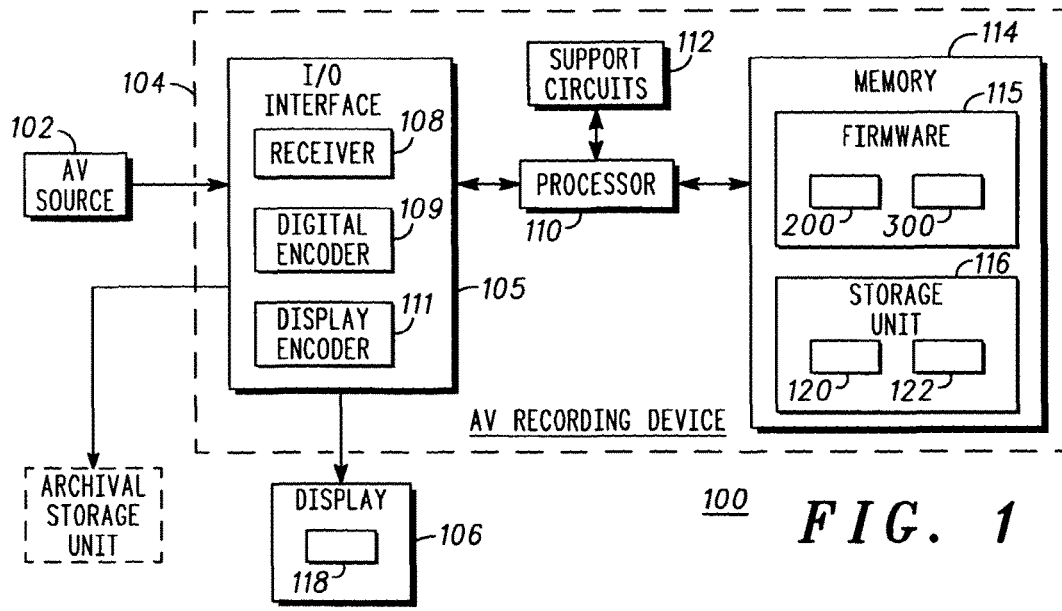
FIG. 1 is a block diagram depicting an exemplary embodiment of an audio/video (AV) system.

FIG. 1 is a block diagram depicting an exemplary embodiment of an audio/video (AV) system 100. The system 100 comprises an AV source 102, an AV recording device 104, and a display 106. The AV source 102 comprises an analog or digital source of AV signals, such as land-based radio-frequency type broadcast networks, cable networks, space satellite signal transmission networks, broadband telephone networks, and the like, or an external tuning device (e.g., set-top box) coupled to such networks. Each AV signal carries various programs or services defined by a programming schedule. Each of the programs or services comprises one or more of audio, video, and data (generally referred to herein as an "AV program").

The AV recording device 104 illustratively comprises an input/output (I/O) interface 105, a processor 110, various support circuits 112, and a memory 114. In one embodiment, the I/O interface 105 receives RF signals from the AV source 102. The I/O interface 105 includes a receiver 108 and a digital encoder 109. The receiver 108 processes AV signals from the AV source 102 in a well-known manner to select a channel and provide a baseband signal associated with the selected channel. The receiver 108 is controlled using the processor 110 (e.g., channel selection). The selected baseband signal carries AV program data in accordance with a programming schedule. The digital encoder 109 processes the baseband signal to provide digital AV program data ("AV program data"). The AV program data may be in any type of digital format suitable for storage in the memory 114. For example, the digital encoder 109 may be an MPEG encoder, and the AV program data may be formatted in accordance with an MPEG standard, such as the MPEG-2 format as defined in ISO/IEC Standard 13818.

In another embodiment, the I/O interface 105 receives a selected baseband signal carrying the desired AV program data directly from the AV source 102 (e.g., the AV source 102 may comprise a set-top box). For example, the baseband signal from the AV source 102 may be an analog signal and the digital encoder 109 may process the analog baseband signal to produce the AV program data described above. In another example, the baseband signal from the AV source 102 may be a digital signal that is already suitably formatted for storage within the memory 114 (i.e., the AV source 102 may provide an MPEG-2 transport stream carrying the AV program data). In any embodiment, the I/O interface 105 is coupled to the memory 114, either directly or through the processor 110, for providing AV program data for storage.

The AV program data is stored within the memory 114. The memory 114 may be any type of storage medium, including one or more of random access memory, read only memory, magneto-resistive read/write memory, optical read/ write memory, cache memory, magnetic read/write memory, and the like, as well as signal-bearing media as described below. Notably, the memory 114 generally includes a first portion for system operations and a second portion for dedicated AV program storage. For example, in one embodiment, the memory 114 comprises firmware 115 and a storage unit 116. The storage unit 116 may comprise any type of large-capacity storage medium known in the art, such as a hard disc drive. The storage unit 116 may be sub-divided or partitioned to provide a first portion 120 and a second portion 122. The first portion 120 may be configured to store various recording parameters ("recording configuration data") and the like that facilitate operation of the AV recording device 104. The second portion 122 may be configured to store the AV program data. The firmware 115 may store all or portions of one or more programs and/or data to implement the processes and methods of the invention described herein, including capacity analysis process 200 and recoding configuration modification process 400, described below. The AV recording device 104 may be optionally coupled to an archival storage unit 117 via the I/O interface 105. The archival storage unit 117 may comprise any type of large-capacity storage medium known in the art, such as a hard disc drive, and may be used to archive program data stored within the storage unit 116.

The processor 110 may be any type of instruction-set processor (e.g., microcontroller) or microprocessor known in the art. The support circuits 112 for the processor 110 include conventional circuits to facilitate operation of the AV recording device 104, such as power supplies, amplifiers, input/output interfaces, and the like. The processor 110 may execute program(s) stored in the firmware 115, such as the capacity analysis process 200 and the recoding configuration modification process 400, described below. Although the invention is disclosed as being implemented as a processor executing a software program, those skilled in the art will appreciate that the invention may be implemented in hardware, software, or a combination of hardware and software. Such implementations may include a number of processors independently executing various programs and dedicated hardware, such as application specific integrated circuits (ASICs), field programmable gate arrays (FPGAs), and the like.

The I/O interface 105 is further configured to provide data for display on the display 106. Notably, the I/O interface 105 includes a display encoder 111 for formatting the data to be displayed. The data to be displayed may include the AV program data stored within the memory 114, as well as temporally dynamic indicia of the capacity of the storage unit 116, which is described below. The display encoder 111 processes the data in a well-known manner for display on the display 106. Notably, temporally dynamic indicia 118 of the capacity of the storage unit 116 may be displayed on the display 106. The display 106 may comprise any type of monitor or display known in the art, such as a television.

Figure 2:
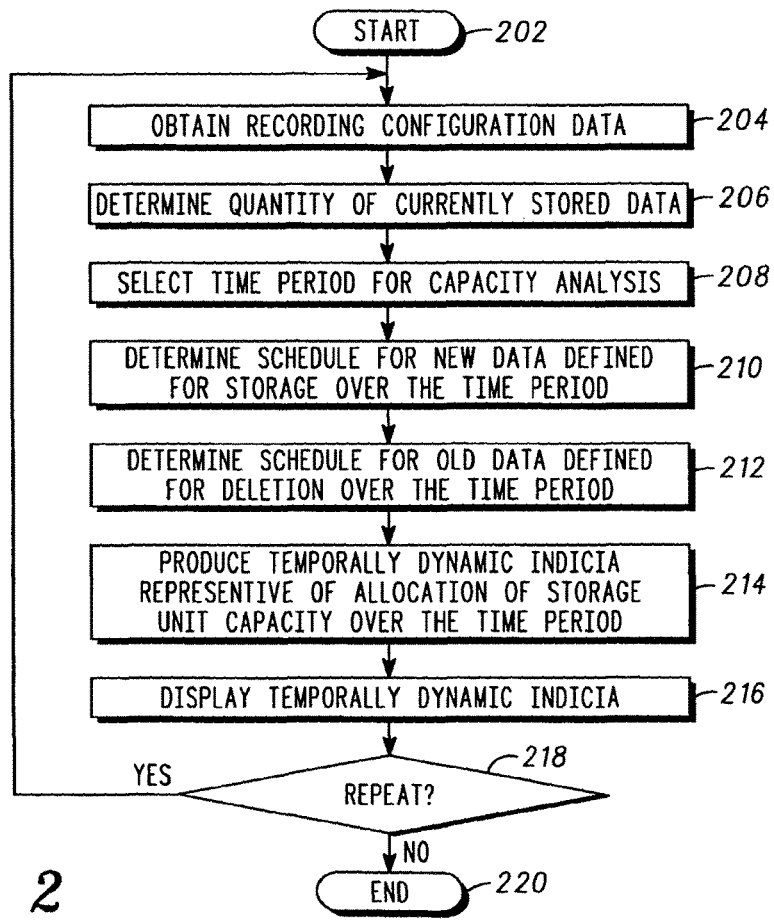
FIG. 2 is a flow diagram depicting an exemplary embodiment of a process for representing capacity allocation of a storage unit within an AV recording device.

FIG. 2 is a flow diagram depicting an exemplary embodiment of a process 200 for representing capacity allocation of a storage unit within an AV recording device. For example, the process 200 may be used to represent allocation of the capacity of the storage unit 116 of the AV recording device 104 shown in FIG. 1 and described above. The process 200 begins at step 202. At step 204, recording configuration data is obtained. The recording configuration data comprises various parameters that facilitate the operation of the AV recording device. For example, the recording configuration parameters may include a schedule of AV programs to be recorded, parameters or a schedule controlling deletion of AV programs, parameters controlling the compression ratio of the stored AV programs, and the quantity of currently stored AV program data.

At step 206, the quantity of currently stored data is identified. At step 208, a time period is selected for a capacity analysis. For example, the selected time period may be measured in terms of hours, days, weeks, and the like. At step 210, a schedule for new data defined for storage over the selected time period is determined. For example, given the recording configuration data, it may be determined that one or more AV programs have been scheduled for recordation by the user during the selected time period. At step 212, a schedule for old data defined for deletion over the selected time period is determined. For example, the recording configuration data may include parameters that dictate when particular stored AV programs are to be deleted from the storage unit (e.g., after a certain amount of time has elapsed, user defined per program, or the like).

At step 214, temporally dynamic indicia are produced that are representative of the change in storage unit capacity over the selected time period (storage capacity allocation). Notably, the temporally dynamic indicia are produced given the quantities of currently stored data, data scheduled for storage, and data scheduled for deletion. The indicia produced at step 214 are "temporally dynamic" in that the indicia accounts for scheduled recordings and deletions (i.e., recordings and deletions that will happen in the future barring cancellation by the user). For example, the temporally dynamic indicia may comprise a plurality of storage configurations or "snapshots" of storage unit capacity allocation defined over the selected time period. Each of the snapshots is related to the storage configuration at a particular instant in time (e.g., how many AV programs are stored and the quantity of data for each AV program). The allocation of storage capacity may differ from snapshot-to-snapshot, since any number of AV programs may be recorded or deleted over the selected time period. The temporally dynamic indicia may comprise any number of snapshots, where more snapshots results in more information and increased resolution. For example, snapshots of storage capacity allocation may be taken every hour during the selected time period.

In this manner, the present invention accurately determines storage capacity allocation of the AV recording device. For example, the present invention can be used to determine that, while there is enough of the storage capacity to store a particular scheduled program now, there may not be enough of the storage capacity to store that scheduled program at the particular scheduled time (i.e., other programs may be scheduled for recordation in the meantime). At step 216, a pictorial representation of the temporally dynamic indicia may be displayed on a display. An exemplary embodiment showing a pictorial display of temporally dynamic indicia is shown in FIGS. 3 and 4 described below. At step 218, a determination is made as to whether another time period is to be selected for analysis. If so, the process 200 returns to step 208, where another time period is selected. If not, the process ends at step 220.

FIGS. 3 and 4 illustrate an exemplary embodiment of a pictorial representation of temporally dynamic indicia representative of storage capacity allocation in accordance with the invention. In the present embodiment, the temporally dynamic indicia comprise an animated pie chart. In particular, FIG. 3 shows a pie chart $300_{T_0}$ at a particular instant in time denoted as $T_0$. FIG. 4 shows a pie chart $300_{T_1}$ at another instant in time, subsequent to the time $T_0$, which is denoted as $T_1$. As shown in FIG. 3, the pie chart $300_{T_0}$ includes a plurality of slices 302, illustratively shown as slices $302_1$ through $302_{12}$. The slices 302 represent a respective plurality of currently stored AV programs (i.e., programs 1 through 12). The area of each of the slices 302 corresponds to the quantity of stored data for a respective one of the AV programs. A region 304 of the pie chart 300 is representative of the current recording capability of the storage unit (i.e., the quantity of free space).

As shown in FIG. 4, at time $T_1$, one of the AV programs is deleted from storage (i.e., the AV program associated with the slice $302_5$). In addition, the quantity of another one of the AV programs has increased (i.e., the area of the slice $302_1$ has increased). Several iterations of the pie chart may be produced for many different times $T_0$ through $T_N$, where N is an integer greater than zero. Each iteration of the pie chart corresponds to a storage configuration or snapshot of storage capacity allocation of the AV recording device at a particular time. By displaying the iterations in succession, the pie chart is animated to produce temporally dynamic indicia of allocation of storage unit capacity. Those skilled in the art will appreciate that other animations may be used with the present invention to produce temporally dynamic indicia representative of allocation of storage unit capacity. For example, an animated bar having a fixed total area may be used that is formed of several regions related to AV programs, where the regions stretch and contract to show the recording capacity over a period of time.

FIG. 5 is a flow diagram depicting an exemplary embodiment of a process 400 for modifying a recording configuration of an AV recording device. The process 400 begins at step 402. At step 404, a recording configuration is obtained. The recording configuration for the AV recording device illustratively comprise a schedule of AV programs to be recorded, parameters or a schedule controlling deletion of AV programs, parameters controlling the compression ratio of the stored AV programs and the scheduled AV programs, the quantity of currently stored AV program data, and the device for storing AV data (e.g., a primary storage unit or an external archival storage unit).

At step 406, temporally dynamic indicia are generated for the current recording configuration obtained at step 404. The temporally dynamic indicia are generated using the process 200 described above with respect to FIG. 2. At step 408, a determination is made as to whether the recording configuration requires modification to increase free space for storage. For example, the schedule of new AV programs for storage may be such that the available free portion of the storage unit capacity will be exceeded. This may occur, for example, when the user selects an AV program for recordation.

If modification is necessary, the process 400 proceeds to step 410, where the recording configuration data is modified. For example, a currently stored program may be re-stored on the storage unit using a higher compression ratio. Alternatively, the compression ratio of a scheduled AV program may be changed from a default value. In yet another alternative, a currently stored program may be automatically deleted. In another example, a currently stored program may be archived to an external storage medium. The permissible modifications are parameters that may be set by default or set by the user. Those skilled in the art will appreciate that other types of modifications may be employed to increase storage capacity. Regardless of the modification used, the temporally dynamic indicia produced by the present invention provide a more accurate view of storage capacity allocation over time and allows for more efficient use of the storage unit. The process 400 ends at step 412.

The processes and methods described above may be implemented as a computer readable carrier. Program(s) of the computer readable carrier define functions of embodiments and can be contained on a variety of storage media, which include, but are not limited to: (i) information permanently stored on on-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or hard-disk drive or read/writable CD or read/writable DVD.

While the foregoing is directed to illustrative embodiments of the present invention, other and further embodiments of the invention may be devised without departing from the basic scope thereof, and the scope thereof is determined by the claims that follow.

The invention claimed is:

1. A method of determining allocation of storage unit capacity within a recording device, the method comprising:
   identifying a quantity first data stored on a storage unit at a first time;
   obtaining a storage schedule for second data to be stored in the storage unit in a predetermined period of time that is a future period of time relative from the first time, wherein the storage schedule indicates that second data is scheduled for recordation in the predetermined time period;
   obtaining a deletion schedule for third data over the predetermined time period, wherein the deletion schedule indicates one or more times that the third data is scheduled for deletion in the predetermined time period, and the third data includes one or more of the first data and the second data; and
   producing indicia representative of allocation of the storage unit capacity over the predetermined time period in response to the quantity of first data, the storage schedule, and the deletion schedule.

2. The method of claim 1, further comprising:
   displaying a pictorial representation of the indicia on a display device in communication with the recording device.

3. The method of claim 1, wherein the producing indicia further comprises:
   determining a plurality of storage configurations for a respective plurality of times, the determining comprising iteratively repeating:
   selecting a time;
   determining a storage configuration of the storage unit in response to the quantity of recording device program data, the storage schedule, and the deletion schedule at the selected time;
   combining the plurality of storage configurations to form the indicia.

4. The method of claim 3, further comprising:
   successively displaying pictorial representations of the plurality of storage configurations on a display device in communication with the recording device to define a graphical animation.

5. The method of claim 4, wherein the graphical animation comprises a pie chart.

6. The method of claim 1, further comprising:
   modifying a recording configuration of the recording device in response to the indicia; and
   re-producing the indicia in response to the modified recording configuration.

7. The method of claim 6, wherein the step of modifying comprises at least of:

increasing compression ratio of an AV program stored on the storage unit; and increasing compression ratio of an AV program scheduled for storage on the storage unit.

8. The method of claim 6, wherein the step of modifying comprises deleting an AV program stored on the storage device.

9. The method of claim 6, wherein the step of modifying comprises:

archiving an AV program stored on the storage device.

10. A non-transitory computer readable storage medium including program instructions that instruct a computer to perform a method of determining allocation of storage unit capacity within a recording device, comprising instructions to perform the steps of:

identifying a quantity first data stored on a storage unit at a first time;

obtaining a storage schedule for second data to be stored in the storage unit in a predetermined period of time that is a future period of time relative from the first time, wherein the storage schedule indicates that second data is scheduled for recordation in the predetermined time period;

obtaining a deletion schedule for third data over the predetermined time period, wherein the deletion schedule indicates one or more times that the third data is scheduled for deletion in the predetermined time period, and the third data includes one or more of the first data and the second data; and producing indicia representative of allocation of the storage unit capacity over the predetermined time period in response to the quantity of first data, the storage schedule, and the deletion schedule.

11. The non-transitory computer readable storage medium of claim 10, further comprising:

displaying a pictorial representation of the indicia on a display device in communication with the recording device.

12. The non-transitory computer readable storage medium of claim 10, wherein the producing step further comprises:

determining a plurality of storage configurations for a respective plurality of times, the determining comprising iteratively repeating:

selecting a time;

determining a storage configuration of the storage unit in response to the quantity of recording device program data, the storage schedule, and the deletion schedule at the selected time;

combining the plurality of storage configurations to form the indicia.

13. The non-transitory computer readable storage medium of claim 12, further comprising:

successively displaying pictorial representations of the plurality of storage configurations on a display device in communication with the recording device to define a graphical animation.

14. The non-transitory computer readable storage medium of claim 13, wherein the graphical animation comprises a pie chart.

15. The non-transitory computer readable storage medium of claim 10, further comprising:

modifying a recording configuration of the recording device in response to the indicia; and re-producing the indicia in response to the modified recording configuration.

16. The non-transitory computer readable storage medium of claim 15, wherein the step of modifying comprises at least of:

increasing compression ratio of an AV program stored on the storage unit; and increasing compression ratio of an AV program scheduled for storage on the storage unit.

17. The non-transitory computer readable storage medium of claim 15, wherein the step of modifying comprises: deleting an AV program stored on the storage device.

18. The non-transitory computer readable storage medium of claim 15, wherein the step of modifying comprises:

archiving an AV program stored on the storage device.

19. A system for determining allocation of storage unit capacity within a recording device, comprising:

memory for storing data; and one or more processors operable to perform operations comprising:

identifying a quantity first data stored on the storage unit at a first time;

obtaining a storage schedule for second data to be stored in the storage unit in a predetermined period of time that is a future period of time relative from the first time, wherein the storage schedule indicates that second data is scheduled for recordation in the predetermined time period;

obtaining a deletion schedule for third data over the predetermined time period, wherein the deletion schedule indicates one or more times that the third data is scheduled for deletion in the predetermined time period, and the third data includes one or more of the first data and the second data; and producing indicia representative of allocation of the storage unit capacity over the predetermined time period in response to the quantity of first data, the storage schedule, and the deletion schedule.

20. The system of claim 19, further comprising:

displaying a pictorial representation of the indicia on a display device in communication with the recording device.

* * * * *